(12) United States Patent
Noguchi et al.

(10) Patent No.: US 10,444,073 B1
(45) Date of Patent: Oct. 15, 2019

(54) FRAME, SPECTROSCOPE, SPECTROMETRY UNIT, AND IMAGE FORMING APPARATUS

(71) Applicants: Hidetaka Noguchi, Hyogo (JP); Junichi Azumi, Miyagi (JP); Hidenori Kato, Hyogo (JP); Masayuki Fujishima, Kanagawa (JP); Masashi Suematsu, Hyogo (JP)

(72) Inventors: Hidetaka Noguchi, Hyogo (JP); Junichi Azumi, Miyagi (JP); Hidenori Kato, Hyogo (JP); Masayuki Fujishima, Kanagawa (JP); Masashi Suematsu, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/447,056

(22) Filed: Jun. 20, 2019

(30) Foreign Application Priority Data

Jun. 25, 2018 (JP) .................................. 2018-120206

(51) Int. Cl.
*G01J 3/28* (2006.01)
*G01J 3/20* (2006.01)
*G01J 3/04* (2006.01)
*G01J 3/18* (2006.01)

(52) U.S. Cl.
CPC . *G01J 3/20* (2013.01); *G01J 3/04* (2013.01); *G01J 2003/1842* (2013.01)

(58) Field of Classification Search
CPC ........ G01J 3/20; G01J 3/04; G01J 3/02; G01J 2003/1842; G01J 3/28; G01J 3/26; G01J 3/06; G01J 3/30; G01J 3/18
See application file for complete search history.

(56) References Cited

U.S. PATENT DOCUMENTS

| | | |
|---|---|---|
| 6,118,166 A | 9/2000 | Shoji et al. |
| 6,203,673 B1 | 3/2001 | Shoji et al. |
| 2011/0155913 A1 | 6/2011 | Noguchi et al. |
| 2012/0061569 A1 | 3/2012 | Noguchi |
| 2012/0181430 A1 | 7/2012 | Noguchi et al. |
| 2014/0264022 A1 | 9/2014 | Noguchi |
| 2015/0076351 A1 | 3/2015 | Noguchi |
| 2015/0076651 A1 | 3/2015 | Noguchi |

FOREIGN PATENT DOCUMENTS

| | | | |
|---|---|---|---|
| DE | 3621464 A1 * | 1/1987 | ................ G01J 3/20 |
| JP | 2000-298066 | 10/2000 | |
| JP | 2018-119946 | 8/2018 | |

* cited by examiner

*Primary Examiner* — Abdullahi Nur
(74) *Attorney, Agent, or Firm* — IPUSA, PLLC

(57) ABSTRACT

A frame, a spectroscope, a spectrometry unit, and an image forming apparatus. The frame has hollow structure and includes at least four apertures including a first aperture, a second aperture, a third aperture through which light enters the frame, and a fourth aperture, a concave diffraction grating disposed at a position of the first aperture, and a movable reflector disposed at a position of the second aperture to reflect light dispersed by the concave diffraction grating and change a reflection angle of the reflected light. Through the fourth aperture of the frame, the light reflected by the movable reflector exits the frame. The spectroscope includes the frame, and the frame further includes an optical entrance disposed at a position of the third aperture, and an optical exit disposed at a position of the fourth aperture.

11 Claims, 12 Drawing Sheets

FRAME, SPECTROSCOPE, SPECTROMETRY UNIT, AND IMAGE FORMING APPARATUS

CROSS-REFERENCE TO RELATED APPLICATION

This patent application is based on and claims priority pursuant to 35 U.S.C. § 119(a) to Japanese Patent Application No. 2018-120206, filed on Jun. 25, 2018, in the Japan Patent Office, the entire disclosure of which is hereby incorporated by reference herein.

BACKGROUND

Technical Field

Embodiments of the present invention relate to a frame, a spectroscope, a spectrometry unit, and an image forming apparatus.

Background Art

Spectroscopes are optical devices used to disperse the light into light beams of various types of wavelengths such as ultraviolet (UV) light, visible light, near-infrared light, and infrared light, and such various kinds of lights are used for performing spectroscopic analysis. Currently, the needs for, for example, outdoor on-site spectroscopic analysis are increasing in addition to the indoor spectroscopic analysis, and the downsizing of the spectroscopes are in progress such that the spectroscopes will be adapted to various kinds of use.

As a compact spectroscope, a spectroscope provided with a concave diffraction grating that serves as a spectro-element with a light-dispersing function and a light-gathering function, an array sensor using, for example, a silicon (Si) photodiode or an indium gallium arsenide photodiode (InGaAs photodiode), and a light source such as a light-emitting diode (LED) or halogen lamp with a desired wavelength band is known in the art.

For spectroscopes provided with concave diffraction gratings, the Rowland arrangement is known in the art in which an incident aperture, an exit aperture, and a concave diffraction grating are arranged on a Rowland circle whose diameter is equal to the radius of curvature of the concave surface of the concave diffraction grating.

SUMMARY

Embodiments of the present disclosure described herein provide a frame, a spectroscope, a spectrometry unit, and an image forming apparatus. The frame has hollow structure and includes at least four apertures including a first aperture, a second aperture, a third aperture through which light enters the frame, and a fourth aperture, a concave diffraction grating disposed at a position of the first aperture, and a movable reflector disposed at a position of the second aperture to reflect light dispersed by the concave diffraction grating and change a reflection angle of the reflected light. Through the fourth aperture of the frame, the light reflected by the movable reflector exits the frame. The spectroscope includes the frame, and the frame further includes an optical entrance disposed at a position of the third aperture, and an optical exit disposed at a position of the fourth aperture. Through the third aperture and the optical entrance of the frame, light enters the frame. Through the fourth aperture and the optical exit of the frame, the light reflected by the movable reflector exits the frame. The spectrometry unit includes the spectroscope, a photodetector configured to receive the light exited through the optical exit and output a signal according to the received light, and circuitry configured to obtain a spectrum based on the signal output from the photodetector. The image forming apparatus includes the spectrometry unit.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
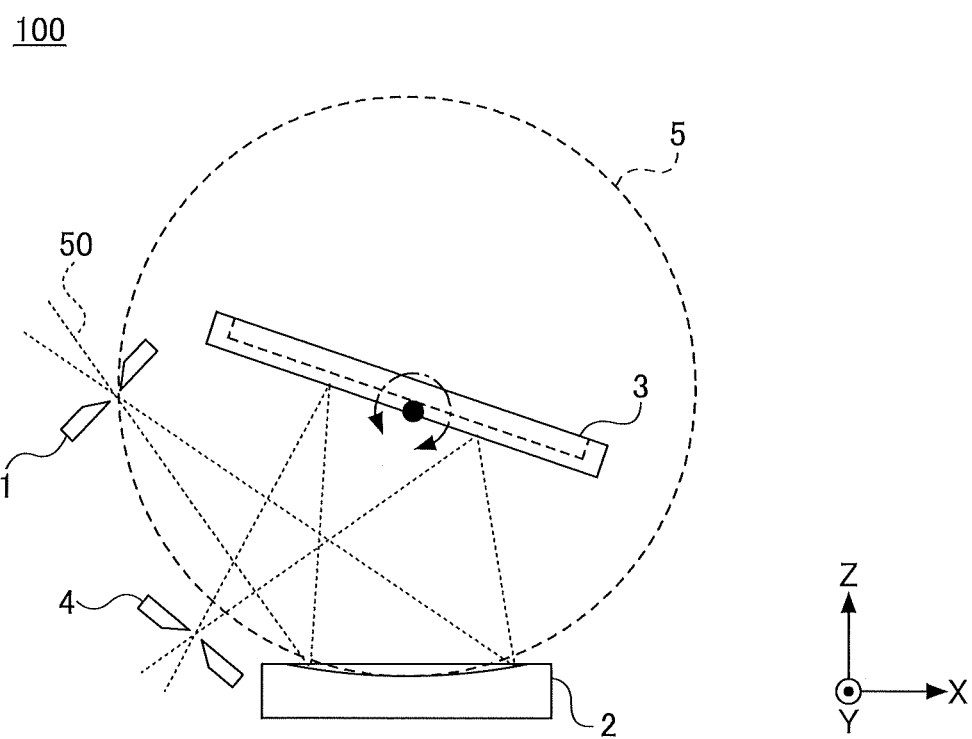
FIG. 1 is a diagram illustrating a basic principle of the spectral operation performed by a spectroscope according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described below with reference to the accompanying drawings. In the drawings, like reference signs denote like elements, and overlapping description may be omitted. In some of the drawings, the direction may be indicated by an arrow with a solid line. It is to be noted that the direction indicated by such an arrow indicates one of the X, Y, and Z directions that are used in common among the drawings.

First Embodiment

The spectroscope 100 according to a first embodiment of the present disclosure is described below.

FIG. 1 is a diagram illustrating a basic principle of the spectral operation performed by the spectroscope 100 according to the present embodiment.

As illustrated in FIG. 1, a spectroscope 100 according to the present embodiment includes an entrance slit 1, a concave diffraction grating 2, a movable mirror 3, and an exit slit 4. The light beams 50 that are indicated by dotted lines in FIG. 1 enter the spectroscope 100, and exit therefrom after propagating inside the spectroscope 100.

The entrance slit 1 is a small rectangular aperture, and serves as an aperture through which light to be dispersed enters the spectroscope 100. The width of the entrance slit 1 in the shorter-side direction is, for example, several ten to several hundred micrometers (µm). For example, the entrance slit 1 is implemented by forming a rectangular through hole on a metal substrate made of nickel (Ni). However, the material of a substrate is not limited to a metal, and may be, for example, a resin. The entrance slit 1 is not limited to a rectangular aperture, and may be, for example, a circular pinhole. The light that enters the spectroscope 100 from the entrance slit 1 is incident on the concave diffraction grating 2 as diverging light. The entrance slit 1 is an example of an optical entrance.

The concave diffraction grating 2 is an optical element where fine lines are formed on a surface of a metal concave mirror at regular intervals. However, the material of the substrate of the concave diffraction grating 2 is not limited to a metal, and may be, for example, a semiconductor, glass, and resin. The fine lines of the concave diffraction grating 2 may be formed on the surface of the base material in a direct manner. Alternatively, the fine lines of the concave diffraction grating 2 may be formed on a film of thin resin or the like formed on the base material. The concave diffraction grating 2 has a light-dispersing function that is implemented by a diffraction grating and a light-gathering function that is implemented by a concave mirror. The light that is incident on the concave diffraction grating 2 is diffracted by the concave diffraction grating 2 to disperse, and is concentrated towards the movable mirror 3. The term "dispersion of light" refers to a phenomenon in which incident light is separated on a wavelength-by-wavelength basis.

The movable mirror 3 is a micro-electromechanical system (MEMS) mirror where a movable part on which a mirror unit is disposed is integrally disposed on a substrate with an elastic beam. The mirror unit reflects the incident light, and the movable part rotates the mirror surface.

Figure 2A:
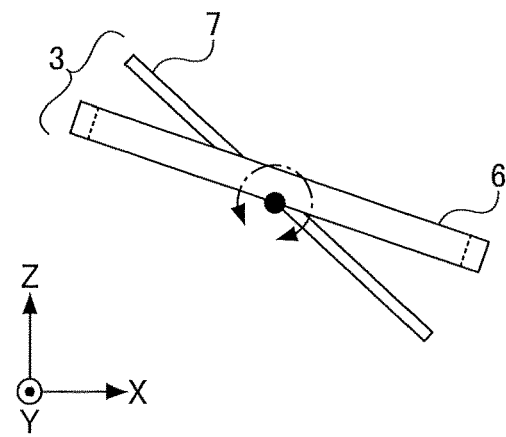
FIG. 2A and FIG. 2B are diagrams each illustrating a configuration of a movable mirror according to the first embodiment of the present disclosure.
Figure 2B:
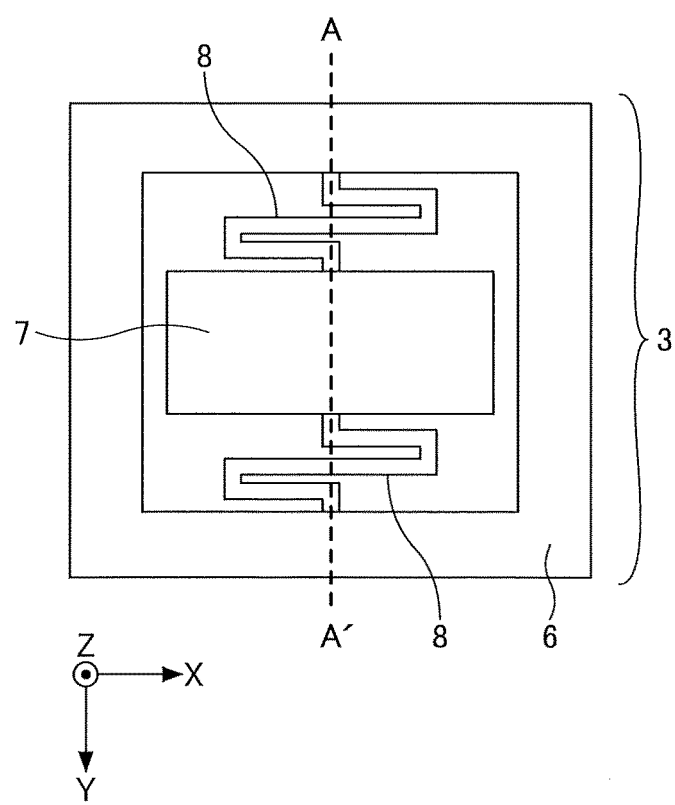

FIG. 2A and FIG. 2B are diagrams each illustrating a configuration of the movable mirror 3 according to the present embodiment.

FIG. 2A is a side view of the movable mirror 3 according to the present embodiment.

FIG. 2B is a plan view of the movable mirror 3 according to the present embodiment.

In the movable mirror 3, a mirror unit 7 is supported on a substrate 6 through a supporting unit 8. The supporting unit 8 serves a torsion spring to which torsion stress can be applied. Some driving force is applied to the movable mirror 3 from an actuator such as a piezoelectric actuator, an electrostatic actuator, and an electromagnetic actuator, and the mirror unit 7 rotates around the axis indicated by broken line A-A' as illustrated in FIG. 2B in the directions indicated by the arrows of alternate long and short dashed lines as illustrated in FIG. 2A. The movable mirror 3 is an example of a movable reflector.

As the actuator of the mirror unit 7 is formed on the substrate 6, in a monolithic manner, the mirror unit 7 can be driven without using an external driver such as a motor, and the mirror unit 7 can be downsized. No limitation is intended, but the material of the substrate 6 is, for example, silicon (Si) or glass. When a semi-conducting material such as silicon (Si) is used for the substrate 6, micromachining or micro processing with a high degree of precision can be implemented by semiconductor processing.

Return to FIG. 1. The movable mirror 3 reflects the light that is dispersed by the concave diffraction grating 2 towards the exit slit 4. The angle of reflection of reflected light is variable by the rotation of the mirror unit 7.

The exit slit 4 is a small rectangular aperture, and serves as an aperture through which dispersed light is exited from the spectroscope 100. The material and shape of the exit slit 4 is equivalent to those of the entrance slit 1 as described above. The exit slit 4 is an example of an optical exit.

The exit slit 4 is arranged at an image-forming position of the light that is dispersed by the concave diffraction grating 2. The image-forming position of the light that is dispersed by the concave diffraction grating 2 shifts according to the wavelength of the light. In order to handle such a situation, the reflection angle by the movable mirror 3 is changed, and the wavelength of the light that passes through the exit slit 4 is changed. By so doing, from among the dispersed lights, light with a desired wavelength can be selectively exited from the spectroscope 100. The light that exits through the spectroscope 100 is detected by a photodetector such as a Si photodiode, and for example, spectrometry is performed on the detected light.

The circle that is indicated by broken lines in FIG. 1 is referred to as a Rowland circle 5, and the diameter of the circle is equal to the radius of curvature of the concave surface of the concave diffraction grating 2. The concave diffraction grating 2 is arranged such that the Rowland circle 5 is circumscribed on the concave diffraction grating 2. In other words, the concave diffraction grating 2 is arranged such that the concave surface forms a part of the Rowland circle 5. Note also that the radius of curvature of the concave surface of the concave diffraction grating 2 is equal to the diameter of the Rowland circle Accordingly, when it is assumed that the arrangement of the Rowland circle is complete, the concave surface of the concave diffraction grating 2 intersects with the Rowland circle at only one point (see FIG. 1). The point at which the concave surface of the concave diffraction grating 2 intersects with the Rowland circle is an example of the circumference of the Rowland circle.

The entrance slit 1 is arranged on the circumference of the circle, and the light enters the spectroscope 100 through the entrance slit 1. Due to this arrangement, the image-forming positions of the light that is dispersed by the concave diffraction grating 2 on a wavelength-by-wavelength basis are all aligned on the circumference of the Rowland circle.

As described above, according to the present embodiment, the movable mirror 3 is rotated to change the reflection angle of the dispersed light, and light of a desired wavelength is selectively exited through the exit slit 4. In order to achieve such functions, the arrangement of the exit slit 4 and the movable mirror 3 is optimized such that light with a predetermined wavelength passes through the aperture of the exit slit 4 depending on the rotation of the movable mirror 3. Such an arrangement can be computed and obtained in advance by performing, for example, optical simulation. FIG. 1 illustrates an embodiment in which the exit slit 4 is arranged outside the circumference of the Rowland circle 5. However, no limitation is indicated thereby, and the exit slit 4 may be disposed on the Rowland circle 5 depending on, for example, the results of the optical simulation as described above.

Figure 3A:
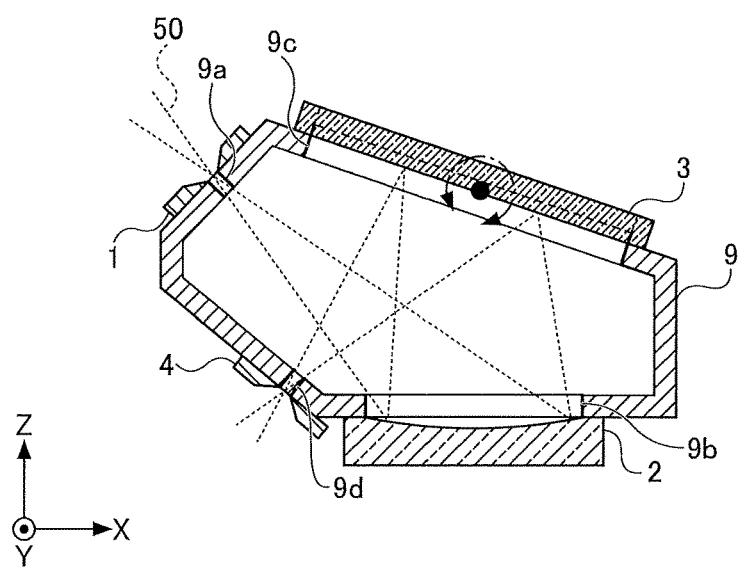
FIG. 3A and FIG. 3B are a diagrams each illustrating a configuration of a spectroscope according to the first embodiment of the present disclosure.
Figure 3B:
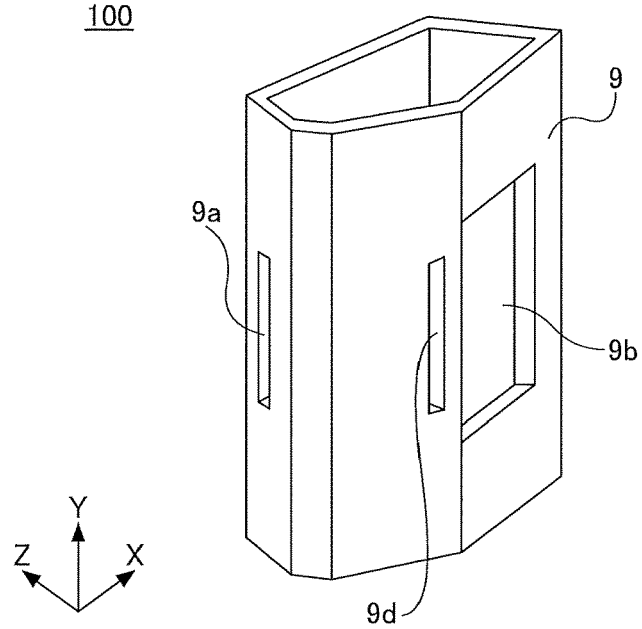

FIG. 3A and FIG. 3B are diagrams each illustrating a configuration of the spectroscope 100 according to the present embodiment.

FIG. 3A is a sectional view of the spectroscope 100 according to the present embodiment.

FIG. 3B is a perspective view of the spectroscope 100 according to the present embodiment.

In FIG. 3A and FIG. 3B, like reference signs are given to like elements of FIG. 1, and overlapping description may be omitted.

The spectrometer 100 has a frame 9. As illustrated in FIG. 3A, the frame 9 is a prism whose cross section is polygonal, and has a hollow structure. The material of the frame 9 is not limited to any particular substance, and may be, for example, resin, metal, and ceramic. Rectangular apertures 9a to 9d each of which communicates between the outside of the frame 9 and the hollow inside the frame 9 are formed at predetermined positions on the plane that makes up the frame 9. The frame 9 is an example of a frame.

An entrance slit 1 is disposed at the position of the aperture 9a. The light that passes through the entrance slit 1 passes through the aperture 9a and enters the hollow inside the frame 9, and propagates towards the aperture 9b.

The entrance slit 1 is fixed on the outer surface of the frame 9. The entrance slit 1 may be fixed by adhesive, or may be fixed by engagement or by using screws. The same thing can be said for a method of fixing an optical element to be arranged at each aperture, which will be described later in detail. The aperture 9a is an example of a third aperture.

A concave diffraction grating 2 is disposed at the position of the aperture 9b. The concave diffraction grating 2 is fixed on the outer surface of the frame 9. The incident light through the aperture 9a passes through the aperture 9b, and then is incident on the concave diffraction grating 2 that is disposed outside the frame 9. The aperture 9b is an example of a first aperture. The light that is incident on the concave diffraction grating 2 is diffracted by the concave diffraction grating 2 to disperse, and propagates while concentrating towards the aperture 9c.

A movable mirror 3 is disposed at the position of the aperture 9c. The movable mirror 3 is fixed on the outer surface of the frame 9. The light that disperses through the concave diffraction grating 2 passes through the aperture 9c, and is incident on the movable mirror 3 that is disposed outside the frame 9. The aperture 9c is an example of a second aperture. The light that is incident on the mirror unit 7 of the movable mirror 3 is reflected by the mirror unit 7 and propagates towards an aperture 9d. The mirror unit 7 of the movable mirror 3 rotates in the directions indicated by the arrows of dashed lines as illustrated in FIG. 3A. As the mirror unit 7 rotates in the area of the aperture 9c on the frame 9, the mirror unit 7 does not touch the frame 9 while the mirror unit 7 is rotating.

An exit slit 4 is disposed at the position of the aperture 9d. The exit slit 4 is fixed on the outer surface of the frame 9. The light that is reflected by the movable mirror 3 passes through the aperture 9d, and exits from the frame 9 as passing through the exit slit 4. The aperture 9d is an example of a fourth aperture.

In the present embodiment, the aperture 9a is formed such that the entrance slit 1 is arranged on the Rowland circle. Moreover, the aperture 9b is formed such that the concave surface of the concave diffraction grating 2 forms a part of the circumference of the Rowland circle. Due to this configuration, the position and inclination of, for example, the concave diffraction grating 2 and the entrance slit 1 that is fixed to the frame 9 can easily be adjusted.

In the present embodiment, the frame 9 whose cross section is polygonal is used, and the straight lines that connect the neighboring vertices of the polygon are continuously engaged with each other In other words, the surfaces of the frame 9 by which optical elements such as the concave diffraction grating 2 or the movable mirror 3 are fixed are integrally molded. Due to this configuration, the deformation of a base material such as the frame 9 can be prevented in the spectroscope 100.

In the present embodiment, multiple optical elements are arranged and fixed on the outer surface of the frame 9. Due to this configuration, a device such as a chip mounter can be used to surface-mount an electronic component on a printed circuit board to implement optical elements such as the concave diffraction grating 2 or the movable mirror 3. As a device such as a chip mounter can be used, optical elements can be aligned with a high degree of precision. Moreover, an individual difference can be reduced when a plurality of spectroscopes are manufactured. Preferably, an inclination correction mechanism such as an abutment or an alignment mark is provided on each surface of the frame 9 in order to prevent the optical elements from being disposed at an oblique angle when the optical elements are mounted.

In the present embodiment, optical elements such as the concave diffraction grating 2 or the movable mirror 3 are not implemented on a primary mounting board (carrier member) such as a printed circuit board, but are directly implemented on the frame 9. Due to this configuration, the limitation to close arrangement of the optical elements or the downsizing of the spectroscope can be prevented as two or more primary mounting boards do not interfere with each other.

As a control sample of the present embodiment, for example, when a spectroscope is configured by arranging a plurality of primary mounting boards each of which is provided with an optical element to form a frame, it is difficult to arrange a primary mounting board with a high degree of precision. As a plurality of substrates are combined, the solidity becomes poor, and deformation or the like may occur. Accordingly, the stability of the spectroscope may be impaired. By contrast, according to the present embodiment, a plurality of optical elements are implemented on the frame 9. Accordingly, a plurality of optical elements can be arranged with a high degree of precision, and the precision of the spectroscope 100 can be improved. Moreover, the stability of the spectroscope 100 can be secured due to the high solidity of the spectroscope 100.

As described above, with the present embodiment, optical elements can be arranged close to each other with high alignment accuracy, and a compact spectroscope can be implemented with a high degree of precision.

Figure 4:
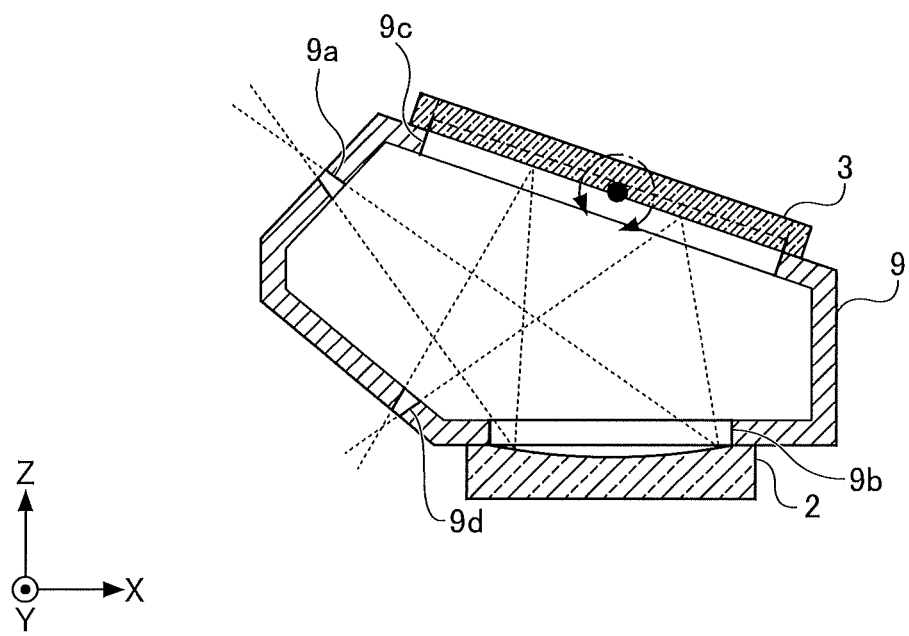
FIG. 4 is a diagram illustrating a modification of the spectroscope according to the first embodiment of the present disclosure.

FIG. 4 is a diagram illustrating a modification of the spectroscope 100 according to the first embodiment of the present disclosure.

A spectroscope 100a according to a modification of the first embodiment of the present disclosure is not provided with the entrance slit 1, and an aperture 9a that is formed on the frame 9 serves as the entrance slit. In other words, light to be dispersed enters the hollow inside the frame 9 through the aperture 9a.

Moreover, the spectroscope 100a is not provided with the exit slit 4, and an aperture 9d that is formed on the frame 9 serves as the exit slit. In other words, the light that is reflected by the movable mirror 3 passes through the aperture 9d and exits the frame 9.

As the aperture 9a and the aperture 9d serve as the entrance slit and the exit slit, respectively, the components of the spectroscope 100a can be reduced. Due to this configuration, the cost of the parts of the spectroscope and the manufacturing cost of the spectroscope can be reduced, and the assembling and adjustment of the spectrometer can be simplified.

By contrast, when the entrance slit 1 is provided as a component separate from the aperture 9a or when the exit slit 4 is provided as a component separate from the aperture 9d as in the first embodiment of the present disclosure, slits of minute size can easily be obtained with a high degree of form accuracy.

Second Embodiment

A spectrometry unit according to a second embodiment of the present disclosure is described below. Like reference signs are given to elements similar to those of the first embodiment as described above, and overlapping description may be omitted.

Figure 5:
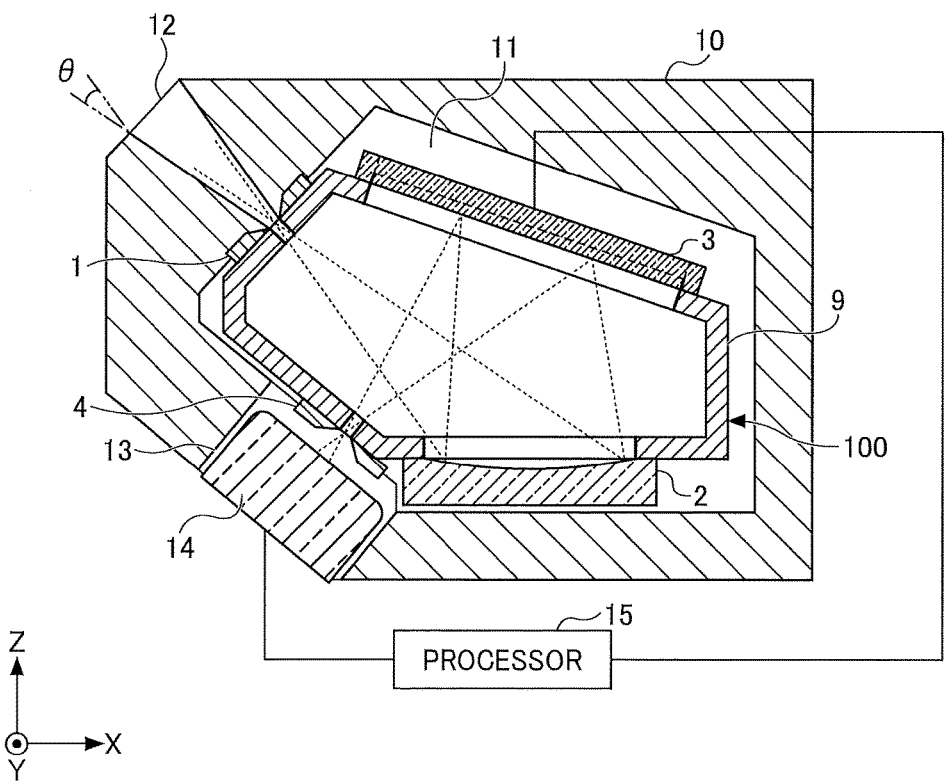
FIG. 5 is a sectional view of a configuration of a spectrometry unit according to a second embodiment of the present disclosure.

FIG. 5 is a sectional view of a configuration of a spectrometry unit 200 according to the present embodiment.

The spectrometry unit 200 includes an outer frame 10, a photodetector 14, and a processor 15.

As illustrated in FIG. 5, the outer frame 10 is a prism whose cross section is polygonal, and has the hollow 11 inside. The spectroscope 100 is arranged in the hollow 11 of the spectrometry unit 200. As described above, the spectroscope 100 according to the present embodiment includes the entrance slit 1, the concave diffraction grating 2, the movable mirror 3, the exit slit 4, and the frame 9. Note also that the faces corresponding to the outer surfaces of the frame 9 are formed in the hollow 11.

As illustrated in FIG. 5, both sides of the outer frame 10 in the Y-direction are open. Due to this configuration, the spectroscope 100 may be inserted to the hollow 11 from any of those open sides and may be fixed inside the hollow 11.

In the outer frame 10, a tapered bore 12 that communicates between the hollow 11 and the outside of the outer frame 10 is formed on the surface opposite the entrance slit 1 of the spectroscope 100 arranged in the hollow 11. The tapered bore 12 has a function to guide the light from the outside of the outer frame 10 to the entrance slit 1.

The tapered bore 12 has a taper angle of θ degree, and the viewing angle of the light incident on the spectroscope 100 is determined by the taper angle. The specification of the viewing angle necessary for the spectroscope 100 is determined in advance, and the tapered bore 12 is formed with the taper angle determined by the specification.

In the outer frame 10, a communicating bore 13 that communicates between the hollow 11 and the outside of the outer frame 10 is formed on the surface opposite the exit slit 4 of the spectroscope 100 arranged in the hollow 11. A photodetector 14 is inserted into the communicating bore 13 and is fixed therein. The light that exits from the exit slit 4 of the spectroscope 100 is incident on the photodetector 14 that is inserted into the communicating bore 13.

The photodetector 14 includes a silicon (Si) light-receiving element that has light-receptive sensitivity for the wavelength band shorter than 1100 nanometers (nm) and a germanium (Ge) light-receiving element that has light-receptive sensitivity for the wavelength band longer than 1100 nm. For example, such a Ge light-receiving element may be a indium gallium arsenide (InGaAs) light-receiving element.

The Si light-receiving element is a light-receiving element of a single pixel, and the Ge light-receiving element is also a light-receiving element of a single pixel. The Si light-receiving element and the Ge light-receiving element are arranged in parallel with each other on a plane that faces the exit slit 4. The Si light-receiving element receives the light whose wavelength band is shorter than 1100 nanometers (nm) from among the lights that exit through the exit slit 4 of the spectroscope 100, and outputs an electrical signal according to the light-receptive intensity. The Ge light-receiving element receives the light whose wavelength band is longer than 1100 nanometers (nm) from among the lights that exit through the exit slit 4 of the spectroscope 100, and outputs an electrical signal according to the light-receptive intensity. The electrical signals that are output by the Si light-receiving element and the Ge light-receiving element are input to the processor 15.

The processor 15 performs computation to obtain a spectrum based on the received electrical signals. Moreover, the processor 15 controls the movable mirror 3 such that light of a desired wavelength is selectively exited.

Figure 6:
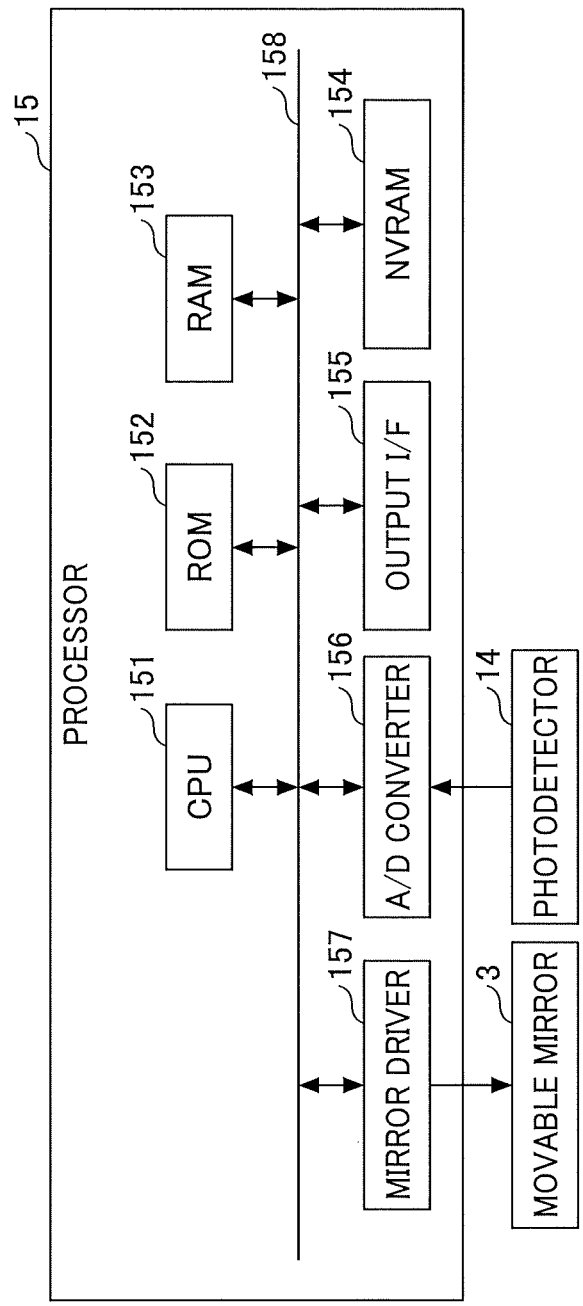
FIG. 6 is a block diagram illustrating a hardware configuration of a processor according to the second embodiment of the present disclosure.

FIG. 6 is a block diagram illustrating a hardware configuration of the processor 15 according to the present embodiment.

The processor 15 includes a central processing unit (CPU) 151, a read only memory (ROM) 152, and a random access memory (RAM) 153. Moreover, the processor 15 includes a non-volatile random access memory (NVRAM) 154, an output interface (I/F) 155, an analog-to-digital (A/D) converter 156, and a mirror driver 157, and these elements are interconnected with each other through a system bus 158.

The CPU 151 controls the operation of the processor 15 in a centralized manner. Moreover, the CPU 151 performs computation to obtain a spectrum based on an electrical signal output from the photodetector 14.

The CPU 151 uses the RAM 153 as a work area, and executes a program stored, for example, in the ROM 152 to perform the processes as described above and implement various kinds of functions as will be described later in detail. Note also that some of or the entirety of these functions implemented by the CPU 151 may be enabled by hardware such as an application specific integrated circuit (ASIC) and a field-programmable gate array (FPGA) using a wired logic connection.

The NVRAM 154 is a nonvolatile memory, and stores the results of computations of, for example, the electrical-signal data or spectrum input to the NVRAM 154.

The output interface 155 is an interface with an external device such as a personal computer (PC) or video equipment.

The A/D converter 156 is an electric circuit that is electrically connected to the photodetector 14, and is used to receive an analog electrical signal output from the photodetector 14 and convert the received analog electrical signal into a digital signal.

The mirror driver 157 is an electric circuit that is electrically connected to the movable mirror 3, and is used to output the voltage or current that indicates the angle at which the mirror unit 7 rotates to the movable mirror 3. The movable mirror 3 rotates the mirror unit 7 such that the angle corresponds to the voltage or current input from the mirror driver 157.

Figure 7:
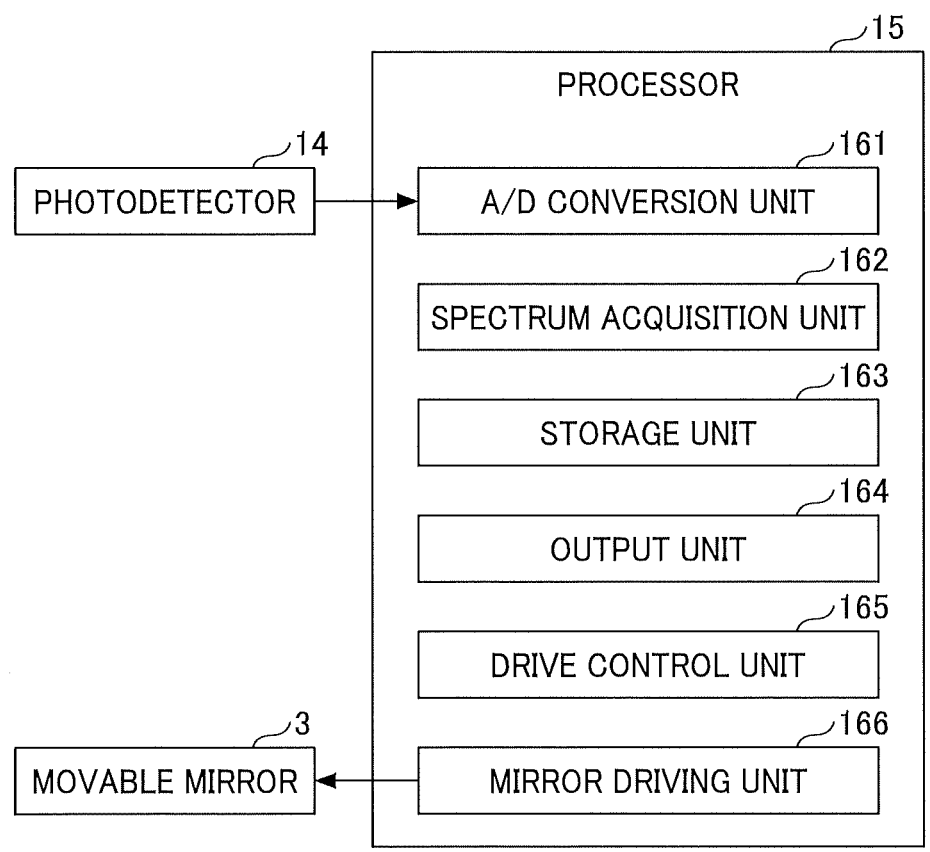
FIG. 7 is a block diagram illustrating the functions of the processor according to the second embodiment of the present disclosure.

FIG. 7 is a functional block diagram illustrating the functional components of the processor 15 according to the present embodiment.

The multiple functional blocks as illustrated in FIG. 7 indicate schematic functions, and it is not necessary for these elements to be physically configured as depicted in the drawings. For example, some of or all of the multiple functional blocks may be functionally or physically distributed or combined at any desired unit. All of or any desired ones of the multiple processing functions that are implemented by a plurality of functional blocks may be implemented by a program executed by the CPU 151 as described above, or may be implemented by hardware using wired logic connection.

The processor 15 includes an A/D conversion unit 161, a spectrum acquisition unit 162, a storage unit 163, an output unit 164, a drive control unit 165, and a mirror driving unit 166.

The A/D conversion unit 161 receives an analog electrical signal output from the photodetector 14 and convert the received analog electrical signal into a digital signal, and outputs the obtained digital signal to, for example, the spectrum acquisition unit 162 and the storage unit 163. For example, the A/D conversion unit 161 is implemented by the A/D converter 156.

The spectrum acquisition unit 162 receives the digital signal output from the A/D conversion unit 161, and performs computation to obtain the spectrum of the light incident on the spectroscope 100. A known computation method can be used for the computation in the present embodiment, and thus the description of such a computation is omitted herein. For example, the computation result is output to the storage unit 163 and the output unit 164. The spectrum acquisition unit 162 is implemented by, for example, the CPU 151.

The storage unit 163 stores the result of calculation performed by the spectrum acquisition unit 162 and the digital-signal data output from the A/D conversion unit 161, and outputs such data to the output unit 164 in response to a request. For example, the storage unit 163 is implemented by the NVRAM 154.

The output unit 164 outputs the result of calculation performed by the spectrum acquisition unit 162 or the digital-signal data output from the A/D conversion unit 161 to an external device such as a personal computer (PC) or video equipment. For example, the output unit 164 is implemented by the output interface 155.

The drive control unit 165 outputs a control signal to control the mirror driving unit 166. For example, the drive control unit 165 is implemented by the CPU 151.

The mirror driving unit 166 outputs the voltage or current to the movable mirror 3 according to the received control signal, and controls the mirror unit 7 to rotate so as to achieve a desired reflection angle. For example, the mirror driving unit 166 is implemented by the mirror driver 157.

When the entrance slit 1 is arranged on the Rowland circle and the concave diffraction grating 2 is arranged such that the concave surface of the concave diffraction grating 2 forms a part of the circumference of the Rowland circle in the present embodiment, all of the light that is dispersed by the concave diffraction grating 2 on a wavelength-by-wavelength basis forms an image on the circumference of the Rowland circle. As the image-forming position of the light shifts according to the wavelength of the light, an array of light-receiving elements such as a line sensor are required to receive all at once the light that is dispersed on a wavelength-by-wavelength basis.

A silicon (Si) light-receiving element array such as a silicon (Si) photodiode array has light-receptive sensitivity only for the light whose wavelength band is shorter than 1100 nanometers (nm). For this reason, a light-receiving element of a compound semiconductor or a semi-conducting material such as germanium (Ge) and indium gallium arsenide (InGaAs) is additionally required in order to receive the light whose wavelength band is longer than 1100 nm. Single-pixel light-receiving elements such as Ge and InGaAs are available at relatively low cost. However, an array of light-receiving elements is very expensive. As described above, a configuration with the use of a Rowland circle enables easy arrangement of optical elements such as a concave diffraction grating, but requires expensive light-receiving element and photodetector.

In the present embodiment, the reflection angle by the movable mirror 3 is changed, and from among the lights that are dispersed by the concave diffraction grating 2, light of a desired wavelength is selectively exited from the spectroscope 100. Accordingly, the light whose wavelength band is shorter than 1100 nm is received by a single-pixel Si light-receiving element, and the light whose wavelength band is longer than 1100 nm can be received by a single-pixel Ge or InGaAs light-receiving element.

As described above, according to the present embodiment, elements are arranged using a Rowland circle, and a spectroscope that enables easy arrangement of optical elements such as a concave diffraction grating can be configured at low cost using a single-pixel light-receiving element. Moreover, spectrometry can be performed on the light with a wide range of wavelength band, ranging from the light with a short wavelength band of about 300 nm, which an Si light-receiving element has light-receptive sensitivity, to the light with a long wavelength band of about 2000 nm, which a Ge light-receiving element or an InGaAs light-receiving element has light-receptive sensitivity.

The other aspects of the present embodiment are similar to those of the first embodiment of the present disclosure as described above.

Third Embodiment

A spectrometry unit according to a third embodiment of the present disclosure is described below. Like reference signs are given to elements similar to those of the first or second embodiment of the present disclosure as described above, and overlapping description may be omitted.

Figure 8:
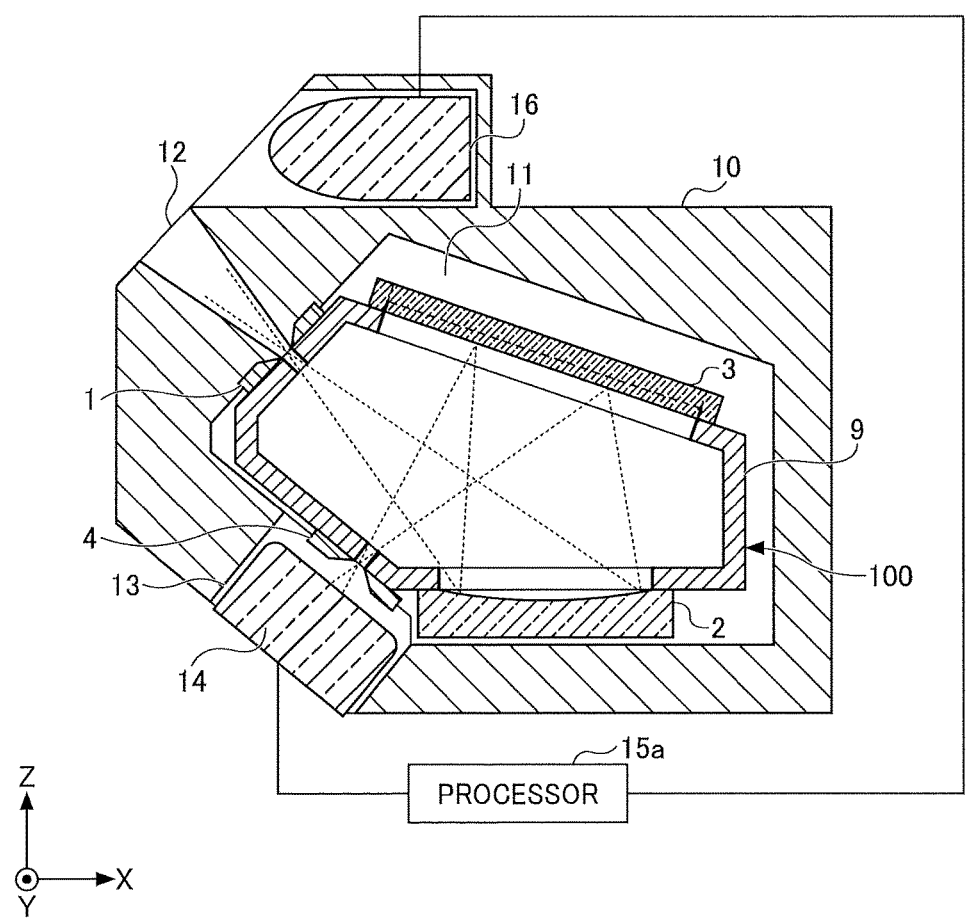
FIG. 8 is a sectional view of a configuration of a spectrometry unit according to a third embodiment of the present disclosure.

FIG. 8 is a sectional view of a configuration of a spectrometry unit 200a according to the present embodiment.

The spectrometry unit 200a includes a light source 16 and a processor 15a.

The light source 16 irradiates an object or the like on which spectrometry is to be performed with light of a desired wavelength band. For example, the light source 16 is a light-emitting diode (LED) or a halogen lamp. The light source 16 is externally arranged outside the outer frame 10. A light source that irradiates an object on which spectrometry is to be performed with light of an appropriate wavelength band is selected as the light source 16 and is arranged.

The processor 15a performs computation to obtain a spectrum based on an electrical signal input from the photodetector 14. Moreover, the processor 15a controls the movable mirror 3 such that light of a desired wavelength is selectively exited. Further, the processor 15a controls the light emission of the light source 16.

Figure 9:
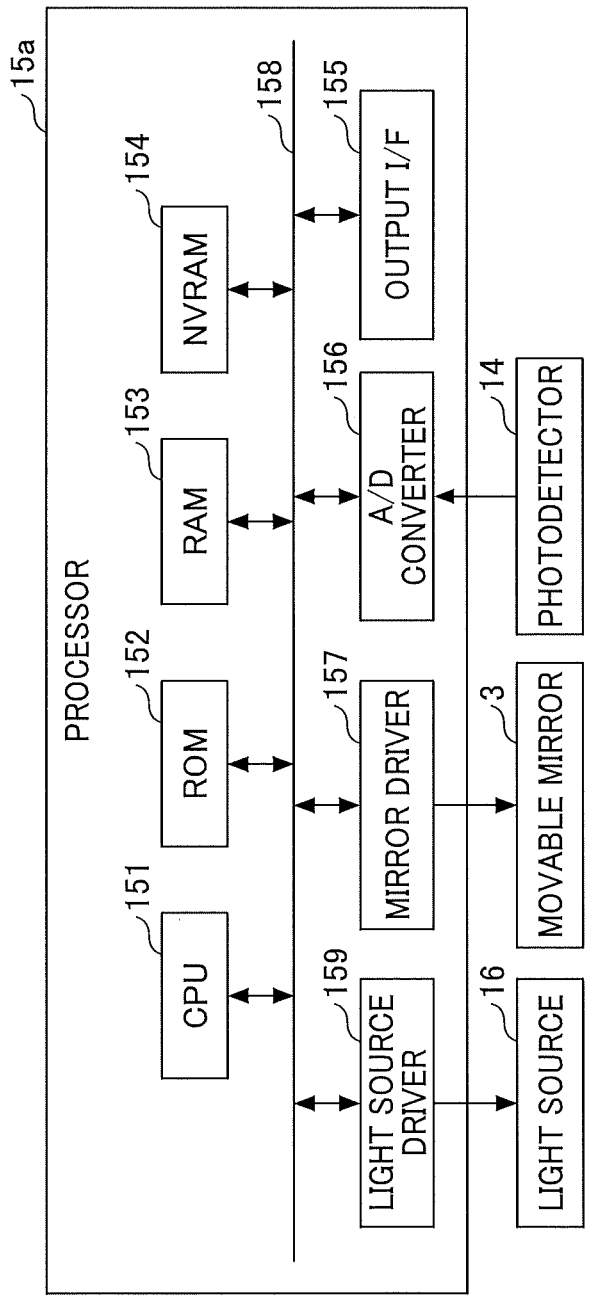
FIG. 9 is a block diagram illustrating a hardware configuration of the processor according to the third embodiment of the present disclosure.

FIG. 9 is a block diagram illustrating a hardware configuration of the processor 15a according to the present embodiment.

The processor 15a includes a light source driver 159. The light source driver 159 is an electric circuit that is electrically connected to the light source 16, and is used to output the voltage or current that indicates the light intensity of light emission to the light source 16. The light source 16 emits light whose intensity corresponds to the voltage or current input from the light source driver 159.

Figure 10:
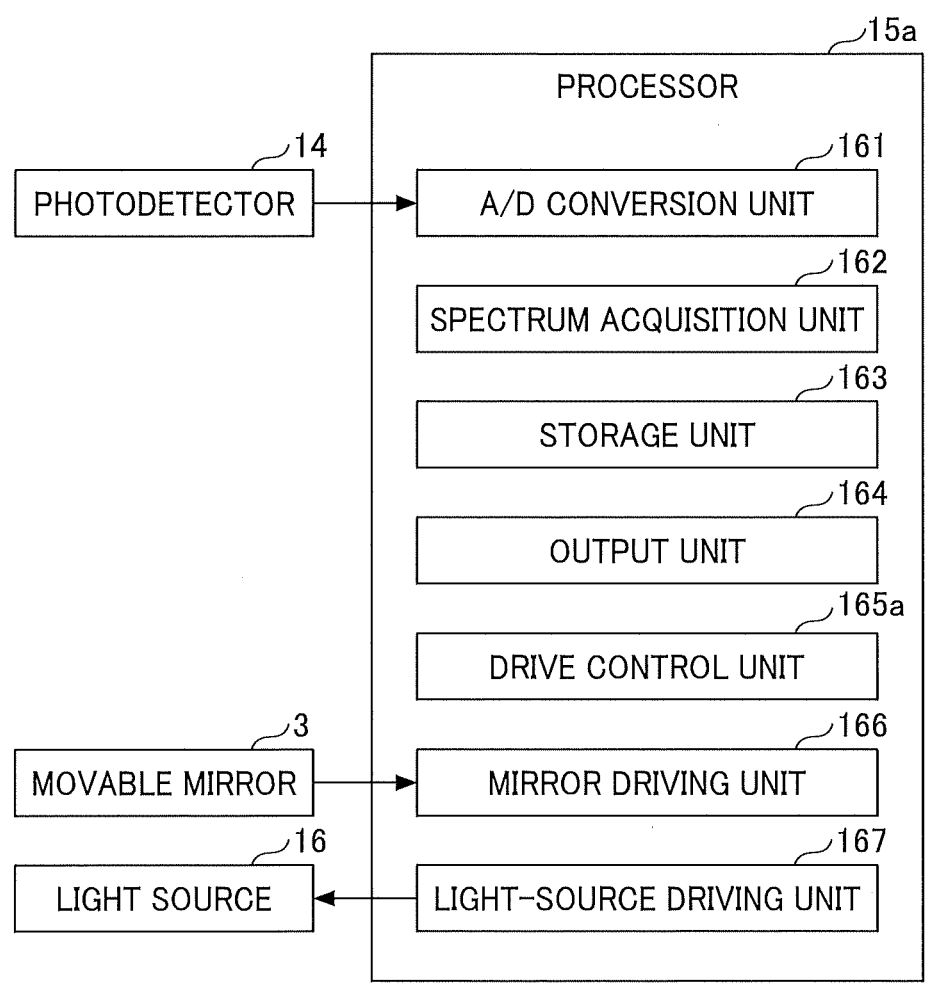
FIG. 10 is a block diagram illustrating the functions of the processor according to the third embodiment of the present disclosure.

FIG. 10 is a functional block diagram illustrating the functional components of the processor 15a according to the present embodiment.

The processor 15a includes a drive control unit 165a and a light-source driving unit 167.

The drive control unit 165a outputs a control signal to control the mirror driving unit 166 and the light-source driving unit 167. For example, the drive control unit 165a is implemented by the CPU 151.

The light-source driving unit 167 outputs the voltage or current to the light source 16 according to the received control signal, and drives the light source 16 so as to achieve a desired intensity of light emission. For example, the light-source driving unit 167 is implemented by the light source driver 159.

According to the present embodiment, various kinds of objects on which spectrometry is to be performed can be irradiated with light of an appropriate wavelength band. As the spectrometry unit is configured to include a light source, there is no need to prepare and install a light source separately from the spectrometry unit. Accordingly, outdoor on-site spectroscopic analysis or the like can easily be performed.

Figure 11:
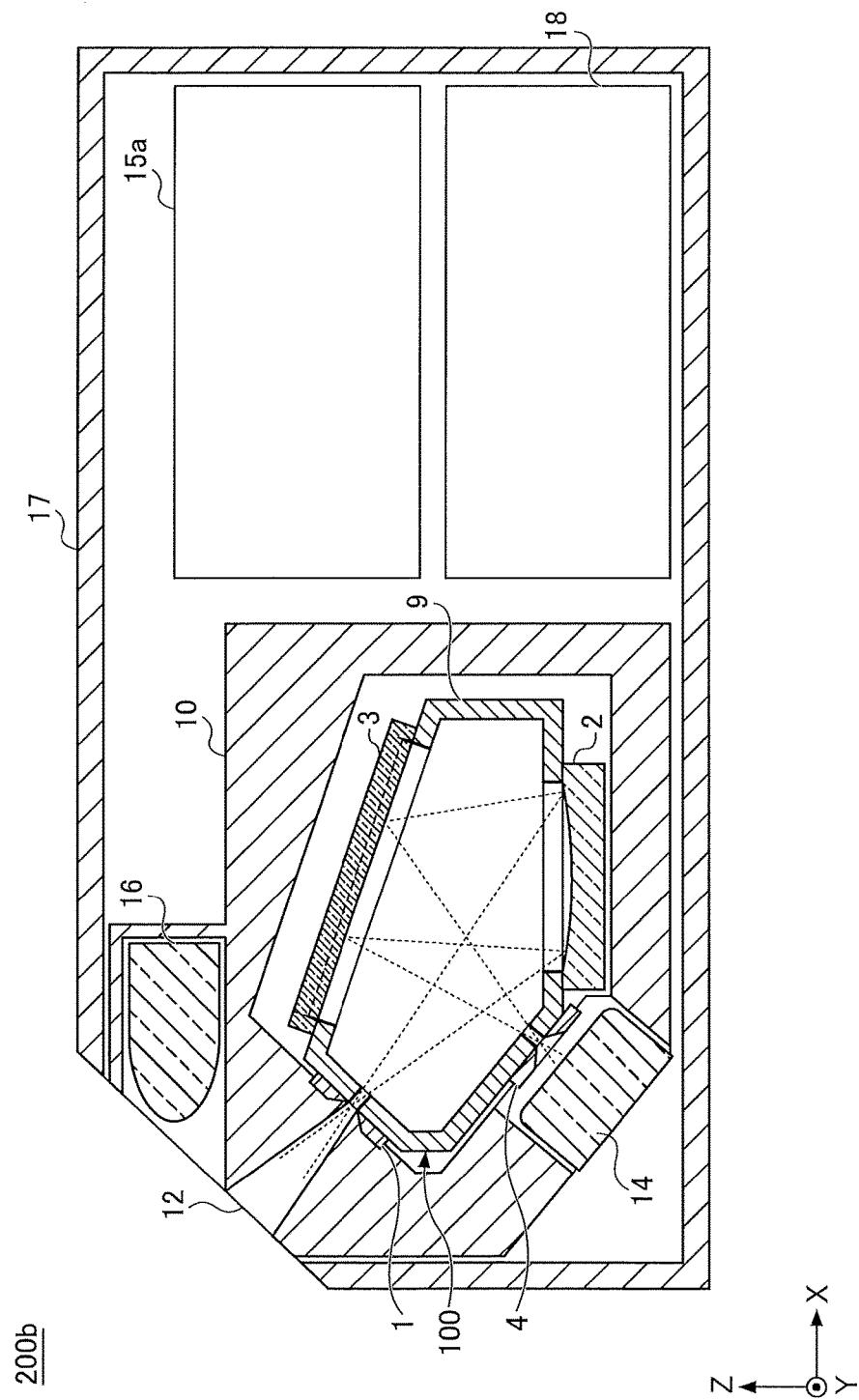
FIG. 11 is a diagram illustrating a modification of the configuration of the spectrometry unit according to the third embodiment of the present disclosure.

FIG. 11 is a diagram illustrating a modification of the configuration of the spectrometry unit according to the third embodiment of the present disclosure.

A spectrometry unit 200b according to a modification of the third embodiment of the present disclosure is provided with a battery 18. Moreover, the spectrometry unit 200b has a housing 17 that accommodates the spectrometry unit 200a, the processor 15a, and a battery 18.

The battery 18 supplies power to the processor 15a. For example, the battery 18 is a lithium-ion battery, a dry cell, or a power-supply unit (PSU).

The processor 15a may include a communication controller to enable data transmission and data reception of, for example, the result of calculation of a spectrum, by communication through short-range communication or the Internet.

The outer frame 10 and the housing 17 may be formed as a single integrated unit.

According to the configuration of the present modification of the third embodiment of the present disclosure, the battery 18 that supplies power is provided, and thus there is no need to prepare and install a power supply separately from the spectrometry unit. Accordingly, spectroscopic analysis can easily be performed on various kinds of objects at any place or time.

The other aspects of the present embodiment are similar to those of the first to second embodiments of the present disclosure as described above.

Fourth Embodiment

A fourth embodiment of the present disclosure is described below. The fourth embodiment relates to an image forming apparatus provided with a spectrometry unit.

Figure 12:
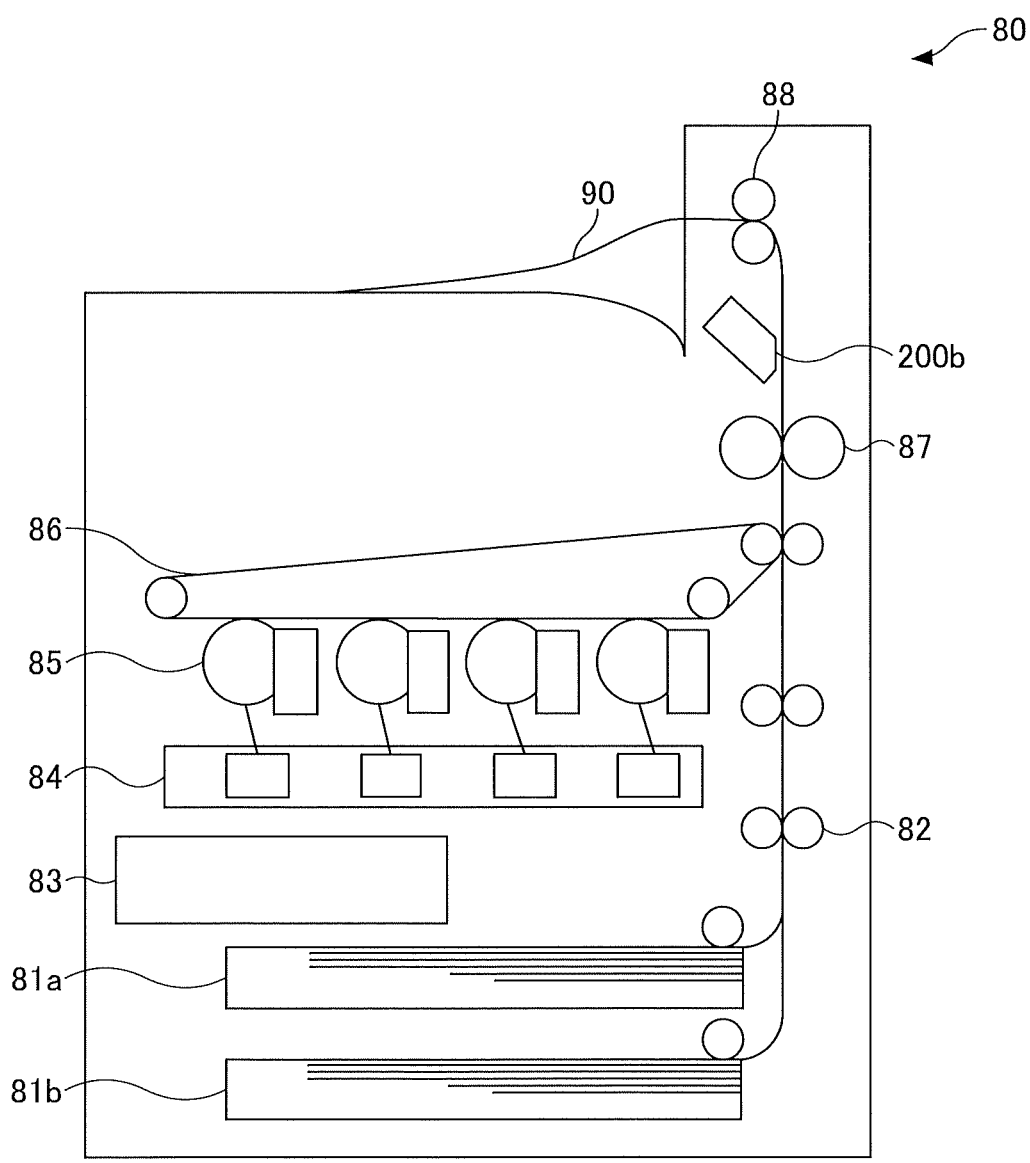
FIG. 12 is a diagram illustrating a configuration of an image forming apparatus according to a fourth embodiment of the present disclosure.

FIG. 12 is a diagram illustrating a configuration of an image forming apparatus 80 according to the fourth embodiment of the present disclosure.

As illustrated in FIG. 12, the image forming apparatus 80 is provided with the spectrometry unit 200b that includes a spectroscope. The image forming apparatus 80 is provided with, for example, a sheet tray 81a, a sheet tray 81b, a paper feeding roller 82, a controller 83, a writing optical system 84, a plurality of photoconductors 85, an intermediate transferor 86, a fixing roller 87, and an output roller pair 88.

In the image forming apparatus 80, when the four photoconductors 85 are exposed to light by the writing optical system 84 based on the image data, an electrostatic latent image of each color is formed on each of the photoconductors 85. Then, developing procedure is performed by making a coloring material such as a toner of the color corresponding to each one of these electrostatic latent images adhere to the corresponding one of the photoconductors 85. Due to this developing procedure, each of the toner images of multiple colors, which is formed on each of the photoconductors 85, is transferred to the intermediate transferor 86 so as to overlap one another.

Subsequently, the toner image that has been transferred onto the surface of the intermediate transferor 86 is transferred to the image-carrying medium 90 such as a piece of paper conveyed from the sheet trays 81a and 81b by a guide and the paper feeding roller 82. As described above, the toner image transferred onto the surface of the image-carrying medium 90 is fixed by the fixing roller 87, and the image-carrying medium 90 is ejected by the output roller pair 88.

In the present embodiment, the spectrometry unit 200b is arranged subsequent to the fixing roller 87. The spectrometry unit 200b controls the light source 16 to irradiate the image-carrying medium 90 with light. The light that is reflected from the surface of the image-carrying medium 90 enters the spectroscope 100 provided for the spectrometry unit 200b. Then, light in a different waveband is selectively extracted by rotating the movable mirror 3, and the light intensity is detected by the photodetector 14.

Then, a reflectance ratio is calculated for each of the wavebands based on the results of the light-intensity detection performed on a waveband-by-waveband basis and the light intensity obtained from a standard white surface or the like, and a spectral reflectance is obtained. When a spectral reflectance as obtained above is used, other spectral characteristics such as a parameter (colorimetric value) of, for example, an XYZ color system and an L*a*b* color system can also be identified.

In the image forming apparatus 80, the spectral characteristics such as a spectral reflectance of an output image (object to be measured) are measured or estimated at a prescribed timing by the spectrometry unit 200b, and the measurement result is sent to the controller 83. The controller 83 serves as an image-forming condition adjuster, and adjusts the image-forming condition based on the received measurement result. Due to this configuration, automatic calibration of color can be performed. As a result, high-quality images with small variations in color can be provided on a continual basis, and thus the image forming apparatus can operate in a stable manner.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A frame having hollow structure, the frame comprising:
   at least four apertures including a first aperture, a second aperture, a third aperture through which light enters the frame, and a fourth aperture;
   a concave diffraction grating disposed at a position of the first aperture; and
   a movable reflector disposed at a position of the second aperture to reflect light dispersed by the concave diffraction grating and change a reflection angle of the reflected light,
   wherein, through the fourth aperture, the light reflected by the movable reflector exits the frame.

2. The frame according to claim 1, wherein the concave diffraction grating and the movable reflector are disposed outside the frame.

3. The frame according to claim 1,
   wherein the third aperture is disposed on a Rowland circle, and
   wherein the concave diffraction grating has a concave surface and the concave surface of the concave diffraction grating is a part of a circumference of the Rowland circle.

4. The frame according to claim 1, further comprising an optical entrance disposed at a position of the third aperture,
   wherein, through the optical entrance, light enters the frame.

5. The frame according to claim 1, further comprising an optical exit disposed at a position of the fourth aperture,
   wherein, through the optical exit, the light reflected by the movable reflector exits the frame.

6. A spectroscope comprising a frame having hollow structure, the frame comprising:
   at least four apertures including a first aperture, a second aperture, a third aperture through which light enters the frame, and a fourth aperture;
   a concave diffraction grating disposed at a position of the first aperture;
   a movable reflector disposed at a position of the second aperture to reflect light dispersed by the concave diffraction grating and change a reflection angle of the reflected light;
   an optical entrance disposed at a position of the third aperture; and
   an optical exit disposed at a position of the fourth aperture,
   wherein, through the third aperture and the optical entrance, light enters the frame, and
   wherein, through the fourth aperture and the optical exit, the light reflected by the movable reflector exits the frame.

7. The spectroscope according to claim 6, further comprising a driver configured to drive the movable reflector.

8. A spectrometry unit comprising:
   a spectroscope comprising a frame having hollow structure, the frame including
      at least four apertures including a first aperture, a second aperture, a third aperture through which light enters the frame, and a fourth aperture,
      a concave diffraction grating disposed at a position of the first aperture,
      a movable reflector disposed at a position of the second aperture to reflect light dispersed by the concave diffraction grating and change a reflection angle of the reflected light,
      an optical entrance disposed at a position of the third aperture; and
      an optical exit disposed at a position of the fourth aperture;
   a photodetector configured to receive the light exited through the optical exit and output a signal according to the received light; and
   circuitry configured to obtain a spectrum based on the signal output from the photodetector,
   wherein, through the third aperture and the optical entrance, light enters the frame, and
   wherein, through the fourth aperture and the optical exit, the light reflected by the movable reflector exits the frame.

9. The spectrometry unit according to claim 8, further comprising a light source configured to irradiate an object with light.

10. The spectrometry unit according to claim 8, further comprising an outer frame to accommodate the spectroscope,
   wherein the outer frame has a tapered bore formed with a prescribed taper angle, and the tapered bore guides extraneous light from an outside of the outer frame to the optical entrance.

11. An image forming apparatus comprising the spectrometry unit according to claim 8.

* * * * *